United States Patent [19]
White et al.

[11] 3,755,881
[45] Sept. 4, 1973

[54] METHODS FOR MAKING EDGELAY THERMOSTATIC BIMETALS

[75] Inventors: Sheldon S. White, Brookline; Henry Ty, Attleboro; Jacob L. Ornstein, Norton; Wesley V. Dudovicz, Rene A. Dubuc, Joseph E. Clark, Attleboro, all of Mass.

[73] Assignee: Texas Instruments Incorporated, Dallas, Tex.

[22] Filed: June 11, 1971

[21] Appl. No.: 152,121

[52] U.S. Cl..................... 29/471.3, 29/480, 219/102
[51] Int. Cl............................................. B23k 31/02
[58] Field of Search........................ 29/471.1, 195.5, 29/471.3, 480; 219/102, 105, 57

[56] References Cited
UNITED STATES PATENTS

| | | | |
|---|---|---|---|
| 2,125,858 | 8/1938 | Hood et al. | 29/480 X |
| 2,481,087 | 9/1949 | Crise | 219/83 |
| 2,490,549 | 12/1949 | Schultz et al. | 29/471.1 |
| 3,497,945 | 3/1970 | Green | 29/488 X |
| 3,514,840 | 6/1970 | Pitler | 29/471.1 X |
| 3,585,709 | 6/1971 | Muller et al. | 29/471.1 X |
| 3,593,409 | 7/1971 | Silverstein | 29/488 |
| 3,639,974 | 2/1972 | Finnegan | 29/471.1 X |

Primary Examiner—J. Spencer Overholser
Assistant Examiner—Richard Bernard Lazarus
Attorney—Harold Levine, James McAndrews et al.

[57] ABSTRACT

A method for making an edgelay thermostatic bimetal is disclosed in which two relatively long and thin strips of metal having the same coefficient of thermal expansion are continuously advanced into edgewise abutting engagement with respective lateral edges of a third, central strip of metal of widely different coefficient of thermal expansion. The pairs of abutting strip edges thus formed are then welded together substantially simultaneously as by tungsten inert gas shielded welding or the like. The simultaneous nature of the weld formation results in substantially uniform heating of all three of the strip materials at the weld location, thereby to avoid the excessive warping and twisting of the resulting, welded composite material which might otherwise occur due to the wide difference in coefficient of thermal expansion between the central strip material and the other strip materials. After cooling of the welded composite, the composite material is slit longitudinally through the central strip of metal to divide the composite into two substantially identical edgelay bimetals each embodying a strip element of relatively low coefficient of thermal expansion and a strip element of relatively high coefficient of thermal expansion. The disclosed apparatus includes means for advancing the three strips of metal in edgewise abutting relation to each other over the periphery of a large metal roll which has two circumferential grooves formed therein, the grooves being arranged to be aligned with pairs of abutting strip edges as the strips are advanced over the roll. A pair of welding means are disposed in closely spaced relation to each other to weld respective pairs of abutting strip edges together substantially simultaneously while the strip edges are positioned over the roll grooves, the large metal roll serving to rapidly conduct heat away from the strips as they are welded to minimize the width of the weld formed between each pair of the metal strips. In a preferred embodiment of the apparatus, additional rolls engage other surfaces of the metal strips being welded to conduct additional heat away from the strips for further reducing the widths of the welds formed between the strips.

11 Claims, 11 Drawing Figures

METHODS FOR MAKING EDGELAY THERMOSTATIC BIMETALS

Edgelay thermostatic materials comprise two relatively long and thin strips of metal of selected width which have widely different coefficients of thermal expansion. Unlike the more conventional thermostatic bimetals in which the broad surfaces of such strip materials are pressure-bonded together, edgelay bimetal materials have these strips joined to each other along thin, abutting lateral edges of the strips so that the resulting bimetal material is adapted to flex in the common plane of the two strips in response to temperature changes. These edgelay thermostatic materials are frequently used to fulfill support functions and are adapted to flex in the noted manner in response to temperature change to physically move the component or element supported by the edgelay bimetals. For example, such edgelay bimetals are commonly used to support shadow masks in color television receivers and are adapted to adjust the physical location of the shadow masks as the receivers are heated up or are subjected to ambient temperature changes.

In the past, various techniques have been used for making such edgelay thermostatic bimetals but all of such techniques have been relatively slow, or expensive or have produced edgelay bimetals of relatively poor quality. For example, where two strips of metal of different coefficients of thermal expansion have been welded together along lateral edges thereof by means of inert gas shielded welding or the like, the heating of the strips which has occurred during the welding has caused severe twisting and warping of the resulting, welded composite material, this twisting and warping being due to the wide difference in thermal expansion between the two, strip materials. As a result of this twisting, only relatively short lengths of the welded composite material could be formed at one time before the twisting rendered the process impossible to control. This short-length, batch process was therefore expensive. Further, where relatively heavy strip materials were welded in this manner and then rolled to thinner gauge in an attempt to increase the output of the process, the rolling to gauge tended to widen the weld between the strip materials, thereby creating a relatively wide, thermostatically-inactive portion along the central axis of the edgelay bimetal to reduce the thermostatic activity or flexivity of the bimetal.

In another prior art technique for making such bimetals, the broad surfaces of relatively thick bars of metal of different coefficients of thermal expansion have been pressure-welded together in a rolling mill. The bonded bars were then cut or sliced in a direction lengthwise of the bars and transversely of the plane of the pressure weld to form thin bimetal elements which each embodied two relatively wide and thin strips of metal bonded together along the thin edges of the strips. This process has been expensive to perform and wastes a substantial amount of the original bar material during the cutting or slicing of the thick bars. Further, the quality of the bonds achieved between the metal materials in the thin elements are sometimes quite poor.

In a more advantageous prior art process for making these bimetals, wire-like, round or hexagonal rods or the like of materials of different coefficients of thermal expansion are resistance welded together along a line of contact between the rods which extends along the lengths of the rods. The welded rods are then rolled in side-by-side relation to each other for forming the rods into thin strip materials in a manner which disposes the weld line between the materials along the lateral edges of the thin strips formed by the rolling, thereby to produce an edgelay bimetal. While this approach has provided process and quality advantages, it is found that some of the materials which are conventionally used in forming thermostatic bimetals (because of their unique thermal expansion properties) are not commercially available in the desired rod form and that special purchase of these materials in rod form adds considerably to the cost of the bimetals produced by this process.

It is an object of this invention to provide novel and improved methods and apparatus for making edgelay bimetals; to provide such methods and apparatus which are adapted for continuous operation in producing such bimetals; to provide such methods and apparatus which are particularly adapted for producing edgelay thermostatic bimetals in which the metal materials therein display widely different coefficients of thermal expansion; to provide such methods and apparatus which utilize starting materials in readily available forms; and to provide such methods and apparatus which produce high quality thermostatic bimetal materials in an inexpensive manner.

Briefly described, the process of this invention includes the steps of advancing two relatively long and thin strips of metal of selected width and of selected coefficient of thermal expansion into edgewise abutting engagement with respective lateral edges of a third, relatively long and thin, central strip of metal of relatively greater width and of widely different coefficient of thermal expansion. These metal strips are advanced over the periphery of a large metal roll which has two circumferential grooves formed therein so that the pairs of abutting edges of the strip materials are aligned with the roll grooves as the strips are advanced over the roll. The pairs of abutting strip edges are then welded together by tungsten inert gas shielded welding or the like, while the pairs of abutting strip edges are disposed over the noted roll grooves, the welding of the two pairs of abutting strip edges being performed substantially simultaneously at locations which are in closely spaced relation to each other. In this arrangement, the strip materials are welded together without tending to be welded to the large metal roll and the large roll serves as a heat sink to conduct heat rapidly away from the strip materials, thereby to limit the welds formed between the strip to relatively narrow widths. The simultaneous way in which the welds are formed between the two pairs of abutting strip edges tends to heat all three of the strip materials to approximately the same temperature in the area in which the welds are formed. Thus the two outer strip materials tend to be subjected to substantially the same degree of thermal expansion during this heating, whereby these thermal expansions tend to counteract each other to prevent excessive warping or twisting of the resulting, three-strip composite material produced by the welding. That is, despite the wide difference in coefficient of thermal expansion between the central strip material and the materials of the outer strips in the composite, the thermal expansions of opposite sides of the composite are substantially balanced to avoid excessive warping or twisting of the composite. As a result, the strip materials are easily welded together in a continuous process and the welded composite is easily coiled on a take-up reel or the like at the end of the process. After cooling of the welded composite, the three-strip composite material is then slit in any conventional manner longitudinally through the relatively wide central strip of metal to divide the composite into two substantially identical edgelay thermostatic bimetals.

Other objects, advantages and details of the methods and apparatus of this invention appear in the following detailed description of preferred embodiments of the invention, the detailed description referring to the drawings in which.

Figure 1:
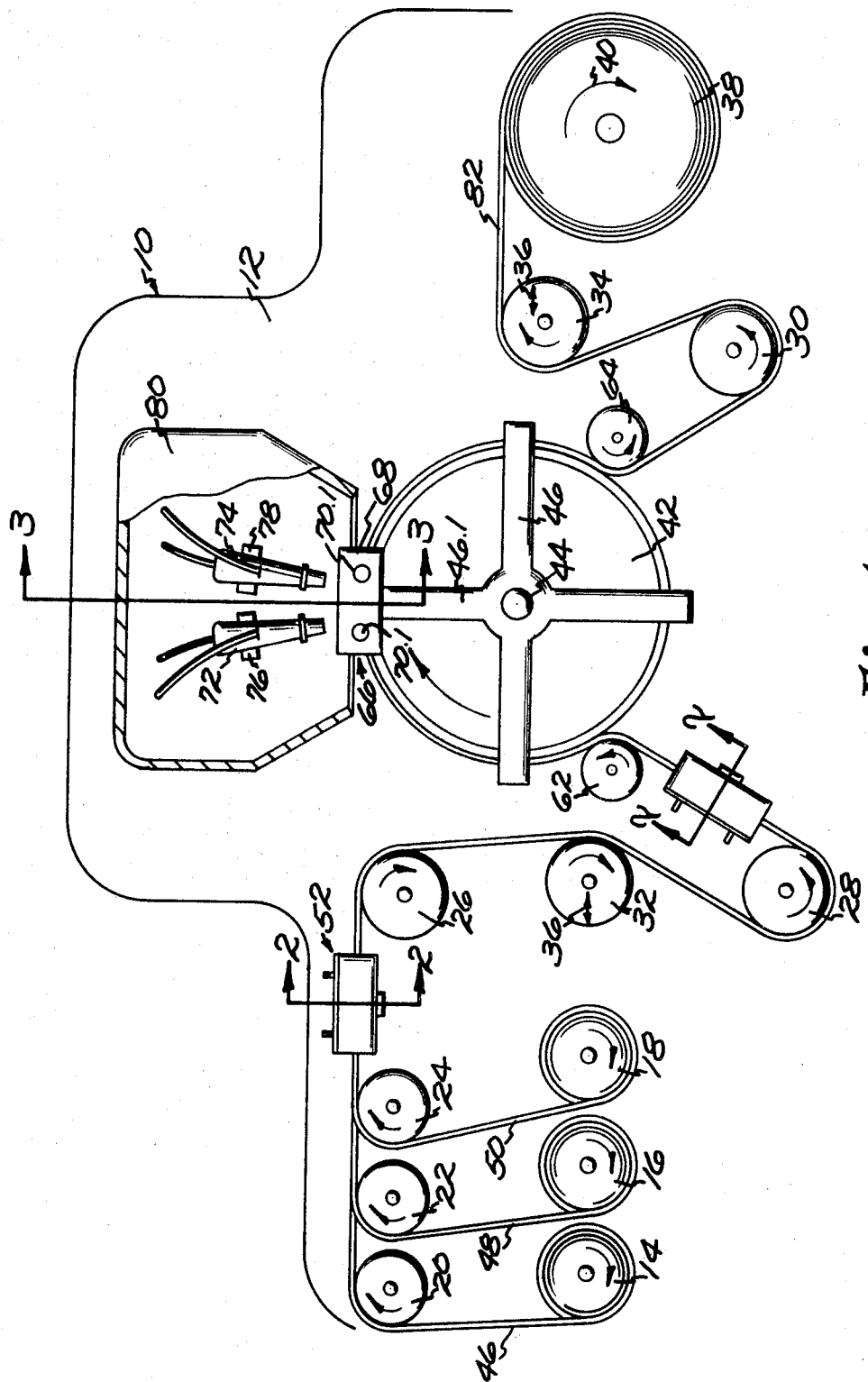
FIG. 1 is a side elevation view of the apparatus of this invention.

Referring to the drawings, 10 indicates the basic apparatus of this invention which is shown to include: a frame 12; three pay-off reels 14, 16 and 18 which are rotatably mounted on the frame in any conventional manner; a suitable number of guide rolls such as the rolls 20, 22, 24, 26, 28 and 30 which are mounted for rotation on the frame; preferably two adjusting guide rolls 32 and 34 which are mounted on the frame for rotation on axes which are adapted to be adjusted in any conventional manner as indicated by the arrows 36, and a take-up reel 38 which is also rotatably mounted on the frame and which is preferably adapted to be rotatably driven in any conventional manner as indicated in FIG. 1 by the arrow 40. A large heat-sink 42 is also mounted on the frame 12 for rotation on the shaft 44, a suitable support 46 attached to the frame serving to assist in support of the roll 42 and its shaft 44.

Figure 2:
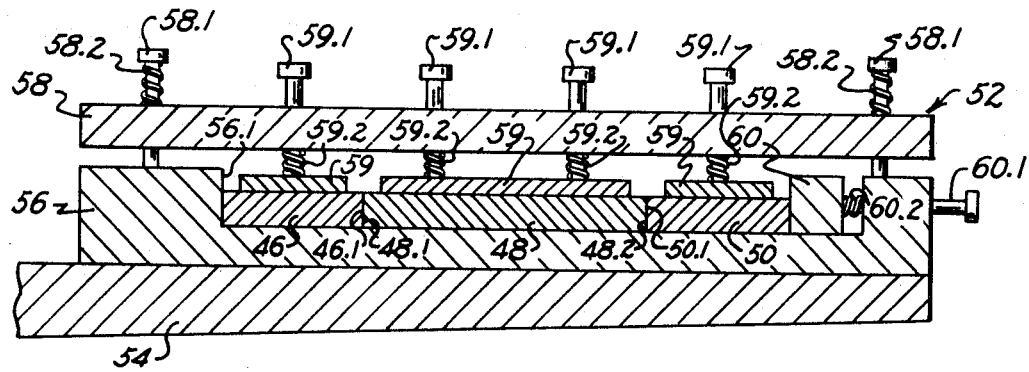
FIG. 2 is a partial section view to enlarged scale along line 2—2 of FIG. 1.

In accordance with this invention, coils of relatively long and thin strips of metal 46, 48 and 50 are disposed on respective pay-off reels 14, 16 and 18 to be initially fed from the pay-off reels over respective guide rolls 20, 22 and 24 and to be advanced over these guide rolls into a conventional strip guide means such as that indicated at 52 in FIGS. 1 and 2. For example, the strip guide means 52 comprises a support 54 attached to the frame 12, a guide block 56 forming a shoulder 56.1, a hold-down plate 58 which is slidably mounted on pins 58.1 secured to the block 56 and which is resiliently biased toward the block 56 by spring means 58.2, three press-down plates 59 which are mounted by pins 59.1 slidable in the plate 58 and which are biased toward the block 56 by springs 59.2, and a guide bar 60 which is mounted by pins 60.1 slidable in the block 56 and which is biased toward the block shoulder 56.1 by spring means 60.2. In this arrangement, as will be understood, the metal strips 46, 48 and 50 advanced from the pay-off reels are resiliently biased into side-by-side edgewise abutting engagement with each other as they are slidably moved through the strip guide means 52. That is, one lateral edge 46.1 of the outer metal strip 46 is guided into edgewise abutting engagement with one lateral edge 48.1 of the central strip 48 while a lateral edge 50.1 of the other outer strip 50 is guided into edgewise abutting engagement with the other lateral edge 48.2 of the central metal strip as shown in FIG. 2. Usually such strip materials have a small camber therein and the clamping forces applied by the guide means 52 tend to overcome this camber in bringing the strips into the desired edgewise abutting engagement with each other.

In accordance with this invention, the metal strips, with the pairs of strip edges 46.1, 48.1 and 50.1, 48.2 retained in said abutting engagement, are advanced from the strip guide means 52 over additional guide rolls 26, 32 and 28 in sequence and are preferably advanced through an additional strip guide means 52 as shown in FIG. 1, the guide roll 32 being adjusted as indicated by the arrow 36 to establish a selected tension in the strip materials being advanced over this movable guide roll. The abutting metal strips are then advanced under a contact roll 62, over the periphery of the heat sink roll 42, and under an additional contact roll 64, these contact rolls preferably being mounted for free rotation on the frame 12 and serving to cooperate with each other in holding the strip materials closely against a major portion of the periphery of the heat sink roll 42. As will be understood, these metal strip materials are then advanced from the contact roll 64 over the guide rolls 30 and 34 to be coiled upon the take-up reel 38, the guide roll 34 being adjusted as indicated by the arrow 36 to take-up any slack in the strip materials being advanced from the heat-sink roll 42 to the take-up reel 38. As will be understood, driving of the take-up reel 38 serves to advance the strip materials through the apparatus 10 in the manner described the rolls 20, 22, 24, 26, 28, 30, 32, 34, 42, 62 and 64 rotating as the strip materials are drawn over the rolls.

In accordance with this invention, the metal strips 46 and 50 are formed of materials having substantially the same coefficient of thermal expansion and, most commonly, are formed of the same metal material and have substantially the same width or thickness. For example, in preferred embodiments of the invention, the strips 46 and 50 each have a thickness in the range from about 0.032 to 0.125 inches (although other strip thicknesses may be used within the scope of this invention) and have widths on the order of 1.5 inches, each of the strip materials 46 and 50 typically comprising a strip 0.065 inches thick and 1.5 inches wide of a ferrous alloy commonly called Alloy 10 which has nominal composition, by weight, of 36 percent nickel and the balance iron. This material displays a relatively low coefficient of thermal expansion of $0.68 \times 10^{-6}$ inch per inch per degree Fahrenheit. The metal strip 48 then preferably embodies a metal material of widely different coefficient of thermal expansion having substantially the same thickness as the strips 46 and 50 and preferably having approximately twice the width of these strips, the strip 48 typically comprising a strip 0.065 inches thick and 3.0 inches wide of a ferrous alloy commonly called Alloy B which has a nominal composition, by weight, of 22 percent nickel, 3 percent chromium and the balance iron. Alloy B has a relatively high coefficient of thermal expansion of $10.5 \times 10^{-6}$ inch per inch degree Fahrenheit.

Figure 3:
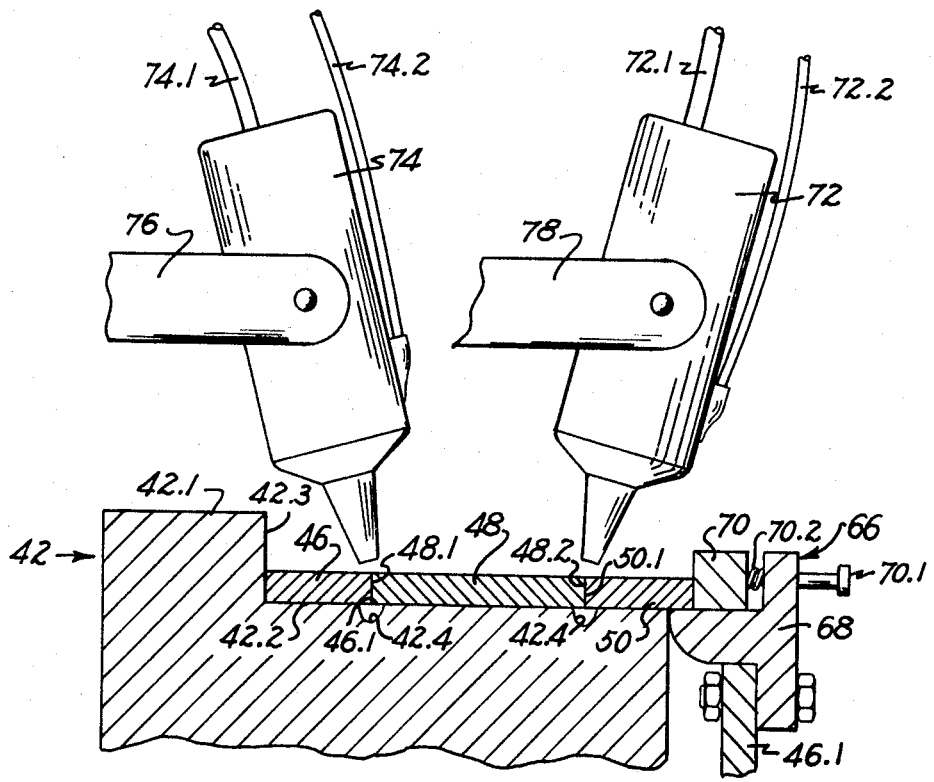
FIG. 3 is a partial section view to enlarged scale along line 3—3 of FIG. 1

In the apparatus 10, the heat-sink roll 42 has two portions 42.1 and 42.2 of different diameters which define an annular shoulder 42.3 therebetween, the peripheral surface of the roll portion 42.2 being provided with two circumferential grooves 42.4 which are spaced from each other and from the roll shoulder 42.3 as shown. Additional strip guide means 66 are arranged to cooperate with the roll 42 in slidably guiding the strip materials 46, 48 and 50 over the roll 42 so that respective pairs of the strip edges 46.1, 48.1 and 50.1, 48.2 are aligned with the roll grooves 42.4 as shown in FIG. 3 and so that the strip materials are held in from edgewise engagement with each other. For example, the strip guide means 66 typically comprise a guide block 68 (mounted on an arm 46.1 extending from the roll support 46) and a guide bar 70 which has pins 70.1 slidable in the guide block and which is resiliently biased by spring means 70.2 toward the roll shoulder 42.3. In this arrangement, the guide bar 70 slidably engages the metal strip 50 and resiliently biases the strips 46, 48 and 50 against the roll shoulder to retain the strips in their edgewise abutting engagement with each other and to position the pairs of abutting strip edges over the roll grooves. Preferably the large roll 42 is formed of a suitable heat-conductive temperature-resistant material such as cast iron. Alternately, depending upon the nature of the metal strip materials processed in the apparatus 10, the roll 42 can also be formed of various copper alloys and the like. Desirably, the large roll 42 is provided with appropriate internal passages and with flexible coupling means or the like to circulate water or other coolant through the body of the roll 42 for maintaining the roll 42 cool during operation of the apparatus 10.

In the apparatus 10, two welding means 72 and 74 of any conventional type are preferably mounted on the frame 12 by any conventional and preferably adjustable support means 76 and 78 so that the welding means are disposed in closely spaced relation to each other to weld the pairs of abutting strip edges 46.1, 48.1 and 50.1, 48.2 to each other substantially simultaneously while the pairs of abutting strip edges are aligned with the grooves 42.4 in the heat-sink roll 42 and while the strip materials are held in good heat-transfer relation to the heat-sink roll 42 by the contact rolls 62 and 64. For example, in a preferred embodiment of this invention, the welding means 72 and 74 each comprise a conventional tungsten inert gas shielded welding torch as is diagrammatically illustrated in FIGS. 1 and 3, the torches including means feeding suitable tungsten electrode material 72.1 and 74.1 to the weld zone at the abutting strip edges and including tube means 72.2 and 74.2 feeding an inert gas such as helium into the weld zone for shielding the welds to be formed from excessive oxidation. As these welding torches are completely conventional including various conventional means for adjusting welding currents and voltages, and means for adjusting coil spacing from the materials to be welded and the like, the torches are not further described and it will be understood that any conventional welding means including plasma torches, short arc welding means, magnesium inert gas shielded welding means, electron beam welding means and the like can be employed within the scope of this invention. Desirably, any conventional exhaust hood arrangement can be utilized as indicated at 80 in FIG. 1 to remove the inert gases and fumes emitted during welding.

In accordance with this invention, the welding means 72 and 74 are preferably disposed to weld the pairs of abutting strip edges 46.1, 48.1 and 50.1, 48.2 together as these pairs of strip edges are advanced past the same point, whereby the welds formed between the strips are formed at locations which are as close together as possible. However, where the size of the torches is a problem, the welding means 72 and 74 can be located so that the welds formed by the torches are spaced a few inches apart. Desirably, the welds are formed within about 10 inches of each other so that the outer strip materials 46 and 50 tend to be heated to substantially the same temperature during the weld formation and so that opposite lateral edges of the central strip material 48 are also heated to substantially the same temperature during the weld formation. That is, the two welds are formed in effectively the same location so that the thermal expansion of the metal strip 46 which occurs during welding substantially corresponds to and is balanced by the thermal expansion of the strip 50 which occurs during welding and so that a similar balance in thermal expansion is achieved between opposite lateral edge portions of the central metal strip 50. This balance of thermal expansion thus permits the resulting composite material 82 formed by welding of the strips 46, 48 and 50 to each other to avoid excessive twisting and warping and to continue to be advanced around the heat-sink roll 42 to the take-up reel 38 without tending to cause pulling or twisting of the composite material away from the zone in which the welds are formed. As will be understood, forming of the noted welds over the circumferential roll grooves 42.4 avoids any welding of the strip materials to the roll and permits free movement of the strip material over the roll 42. Note that the roll 42 rotates as the strip materials are moved over the roll so that the portion of the roll beneath the weld location is cool as welding occurs, thereby preventing welding to the roll and serving to rapidly withdraw heat from the strip materials as they are welded to minimize the width of the welds formed between the strip edges. In this regard, the size of the heat-sink roll 42 is preferably quite large to provide heat-sink capacity which is large relative to the roll heating caused by the weld means 72 and 74.

Figure 4:
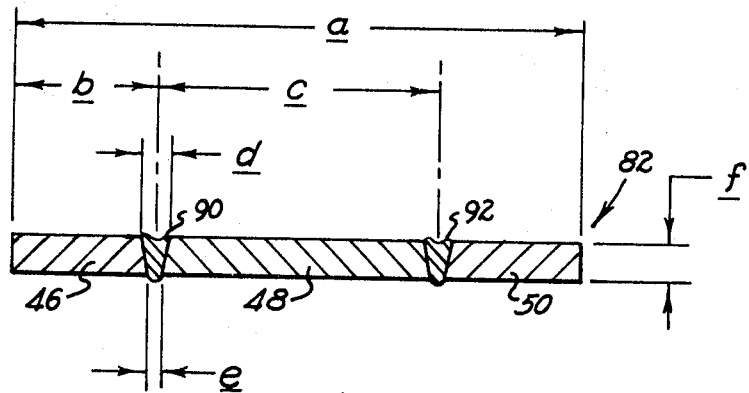
FIG. 4 is a partial section view to enlarged scale along line 4—4 of FIG. 1.
Figure 5:
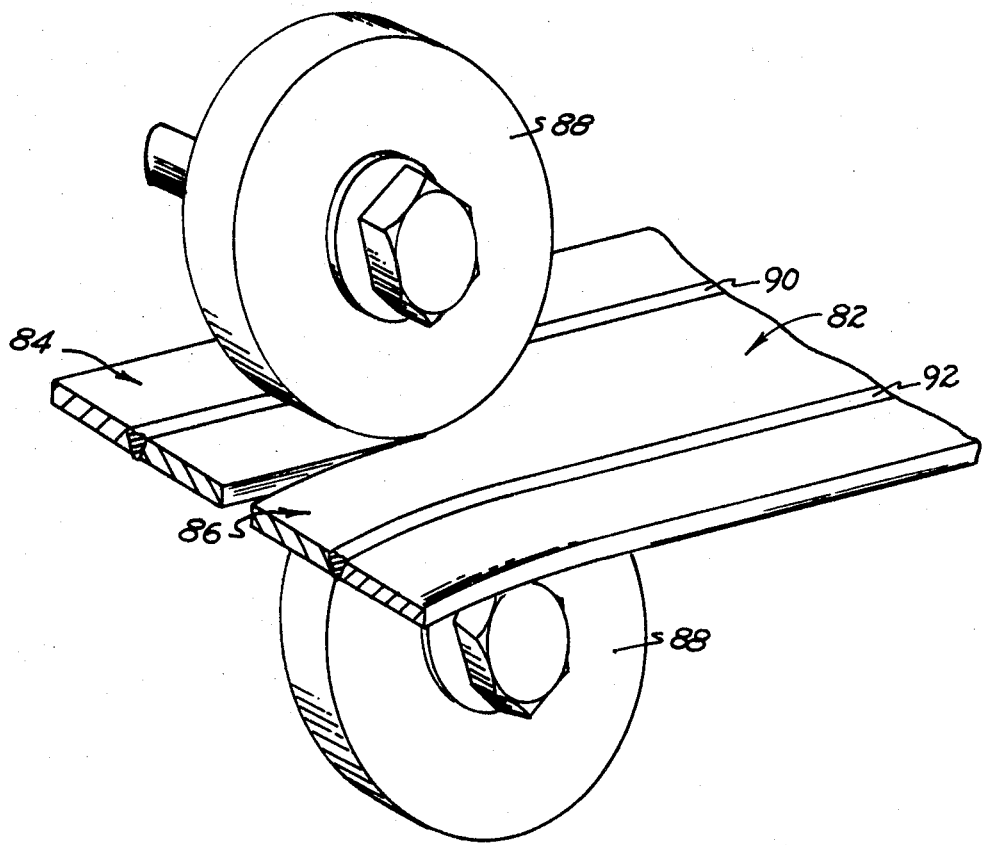
FIG. 5 is a diagrammatic view illustrating a step in the process of this invention.

As will be understood, the noted welding of the strips 46, 48 and 50 forms the composite material 82 which is best shown in FIG. 4. After coiling of this composite on the take-up reel 38 and after cooling of the composite, preferably to room temperature, the composite material is slit longitudinally along the center of the metal strip 48 embodied in the composite for dividing the composite into two strips of edgelay thermostatic bimetal material 84 and 86 as shown in FIG. 5. This slitting is accomplished by any conventional means as by use of a two-roll slitter means 88 diagrammatically illustrated in FIG. 5, or by blade or saw slitting or the like as appears appropriate to the size and types of materials embodied in the composite material 82.

Figure 6:
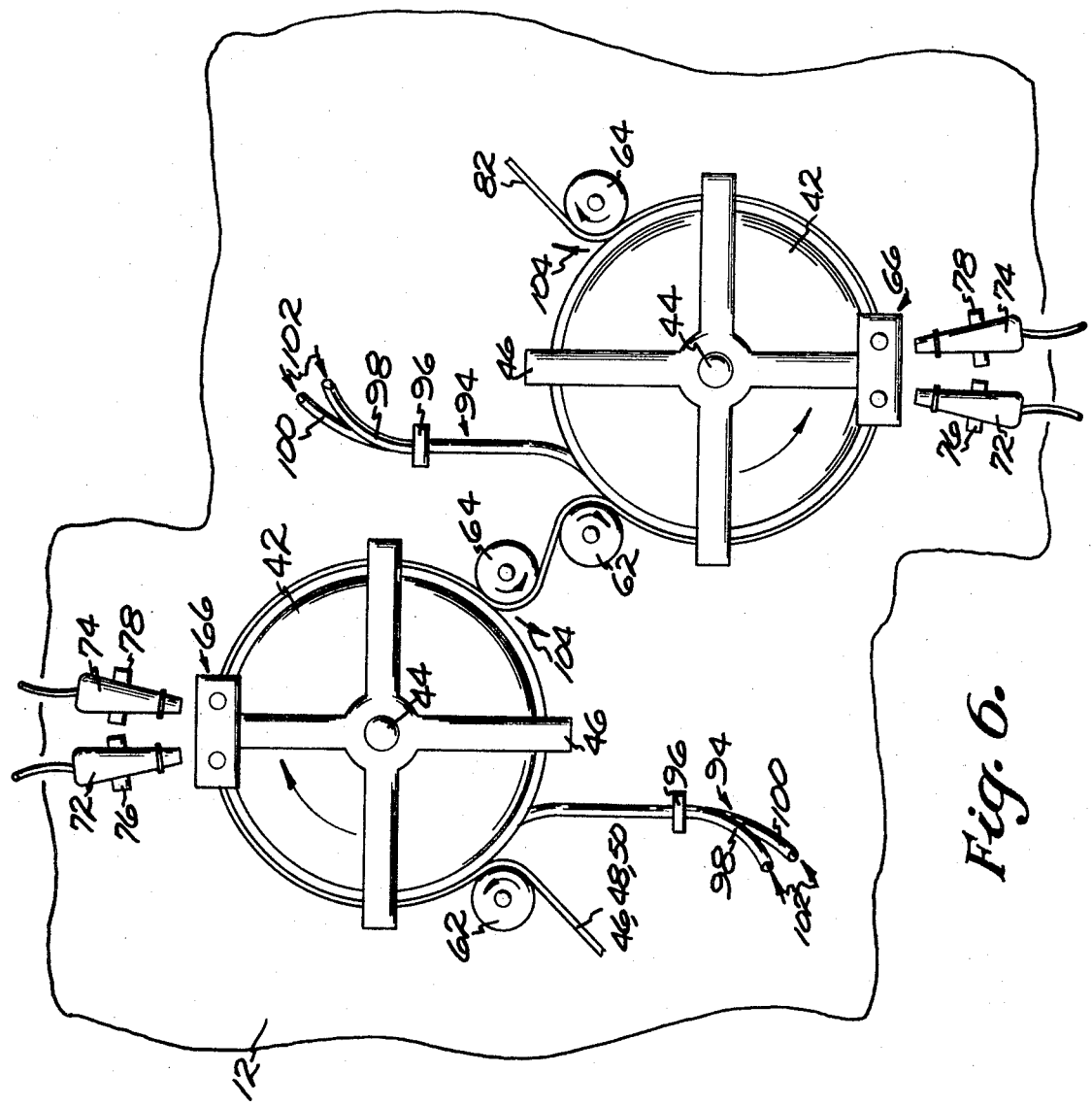
FIG. 6 is a partial side elevation view similar to FIG. 1 illustrating an alternate embodiment of the apparatus of this invention.

In this regard, it will be noted that the composite 82 has the thickness of the original strip materials and has an overall width corresponding substantially to the cumulative widths of the metal strips but that welds 90 and 92 in the composite occupy portions of the width of the composite. When the composite is divided into two edgelay bimetals, one of these welds appears in each of the bimetals. As these welds represent thermostatically inactive portions of the edgelay bimetals, it is important to the thermostatic activity or flexibility of the bimetals that the widths of these welds be minimized. In the process above described, this desirable objection is achieved. That is, heat is applied to the strips 46, 48 and 50 along the strip edges by the weld means 72 and 74 in forming the welds 90 and 92, this heat tending to be conducted away from the strip edges toward the centers of the strips. However, where the roll 42 is large, is thermally-conductive and has a large surface area in contact with the welded strip materials as above described, the roll rapidly conducts heat out of the strip materials as they are welded, thereby to limit the widths of the edge portions of the strips which are heated to welding or fusion temperature so that the total widths of the welds 90 and 92 are significantly limited. In addition, the process of this invention, in permitting rapid manufacture of the edgelay material, makes it possible to make the edgelay materials quite thin - close to the ultimate gauge at which thermostatic bimetals are used. This means that little if any rerolling of the welded materials is required so that the welds can be formed with narrow widths in the thin materials and so that the welds are not significantly widened by any rerolling that may be performed. Further, when the heat-sink roll 42 becomes heated during operation of the apparatus 10, some heat from the roll is transferred to the strip materials 46, 48 and 50 as the strips are advanced toward the weld zone over the roll. This preheating of the metal strips before welding permits edge portions of the strips to be heated to welding temperature more quickly and, where sufficient preheating is achieved is found to improve the width-to-depth ratio of the welds 90 and 92 to desirably narrow the welds which are formed during performance of the process of this invention. For example, where the metal strips 46 and 50 in the composite 82 are formed of Alloy 10 and have a thickness $f$ of 0.065 inches and a width $b$ of 1.5 inches, and where the metal strip 48 is formed of Alloy B and has a thickness of 0.065 inches and a width $c$ of 3.0 inches, the overall width $a$ of the composite 82 is indicated in FIG. 4 is about 6.0 inches. Where these strip materials are welded over a cast iron roll 42 having a diameter of about 30 inches and a width of about 8 inches providing the roll with substantial heat-sink capacity, and where the welds 90 and 92 are formed by tungsten inert gas shielded welding at 12.5 volts — 160 amperes D.C. as the metal strip materials are moved through the weld zone at a speed of about 40 inches per minute (an energy input of about 3,000 joules per inch at each weld), very satisfactory welds 90 and 92 are formed without excessive weld porosity while limiting the weld widths $d$ and $e$ to about 0.090 and 0.040 inches respectively. With welds of this width and quality fully penetrating the thickness of the composite material 82 as shown in FIG. 4, the bimetal materials 84 and 86 were found to display excellent thermostatic activity and weld reliability In other alternate embodiments of this invention, additional features are incorporated in the apparatus 10 for facilitating formation of the desired edgelay bimetals or for improving the quality of the bimetals. For example, in an alternate embodiment of the apparatus 10 illustrated in FIG. 6 (wherein components corresponding to components of the apparatus illustrated in FIG. 1 are identified by the same reference numerals), the apparatus of this invention incorporates two heat-sink rolls 42 and appropriate additional guide rolls, contact rolls and strip guide means. The apparatus also incorporates two pairs of welding means 72 and 74 as shown in FIG. 6. In this arrangement, which is particularly useful where the metal strip materials 46, 48 and 50 are relatively thick, the strip materials are advanced over major portions of each of the heat-sink rolls 42 in sequence. As the strip materials pass over the first heat-sink roll, the pairs of abutting strip edges 46.1, 48.1 and 50.1, 48.2 are welded together substantially simultaneously by respective weld means 72 and 74 from one side of the strip materials, the welding currents and other welding parameters being regulated to achieve only partial weld penetration through the strip materials for minimizing the widths of the resulting welds as will be understood. As the partially welded strip materials are then advanced from the first heat-sink roll 42 to the second heat-sink roll 42, the guide arrangement shown in FIG. 6 causes the opposite sides of the strip materials to be engaged with the second heat-sink roll. Then, as the strip materials are advanced over this second heat-sink roll, additional welds are formed substantially simultaneously between the pairs of partially welded strip edges 46.1, 48.1 and 50.1, 48.2 from the opposite sides of the strip materials, thereby to complete the welds between the strips while continuing to limit the widths of the welds.

Figure 7:
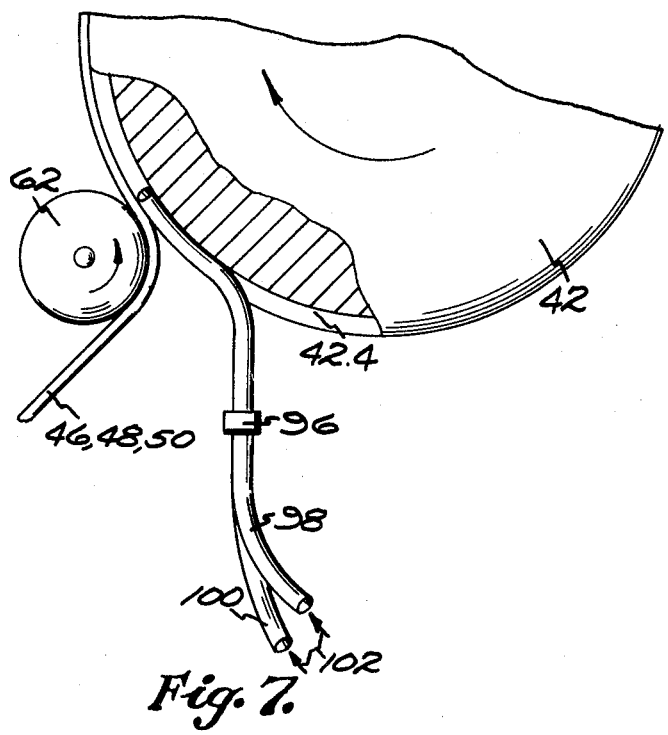
FIG. 7 is a partial perspective view to enlarged scale illustrating features of the apparatus of FIG. 6.

Similarly, where inert gas shielded welding is used in the apparatus 10, the apparatus also preferably incorporates means 94 for improving inert gas shielding of the welds 90 and 92 as these welds are formed. See FIGS. 6 and 7. That is, in the preferred apparatus of this invention, a support 96 attached to the apparatus frame 12 mounts a pair of tubes 98 and 100 adjacent to each heat-sink roll 42 so that tips of the tubes extend into the roll grooves 42.4 under the metal strips 46, 48 and 50 which are held against the roll 42. Inert gas such as helium is then fed through the tubes 98 and 100 in any conventional manner as indicated by the arrows 102 in FIGS. 6 and 7 so that the gas flows through the roll grooves to exit from the grooves at the opposite side of the roll as indicated by the arrow 104. As will be understood, the introduction of this inert gas into the roll grooves 42.4 provides additional shielding of the welds formed between the strip materials in the process of this invention. The additional gas shielding-means 94 is especially useful when incorporated in the apparatus illustrated in FIG. 6 wherein the strip materials are welded from both sides of the strip materials in sequence.

Figure 8:
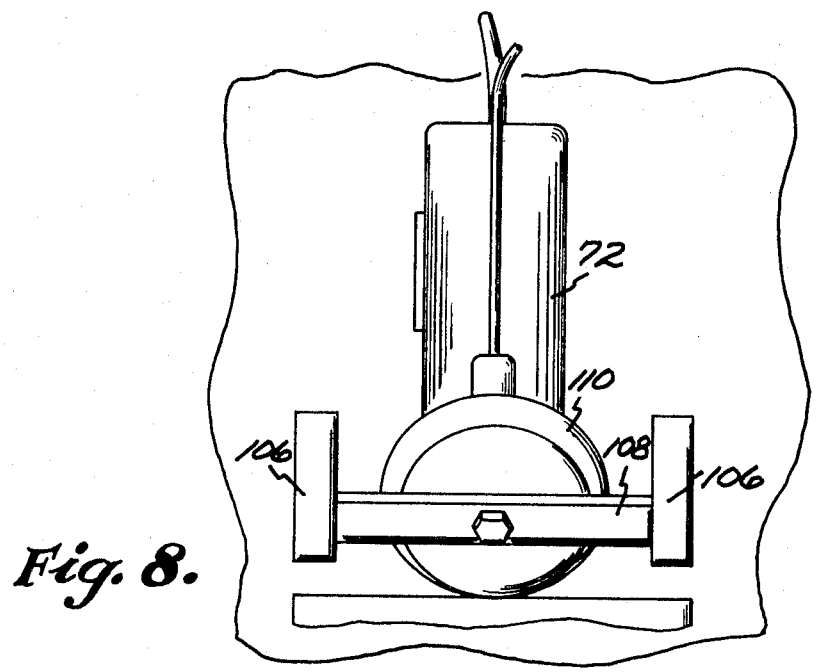
FIG. 8 is a partial side elevation view similar to FIG. 1 illustrating another alternate embodiment of this invention.
Figure 9:
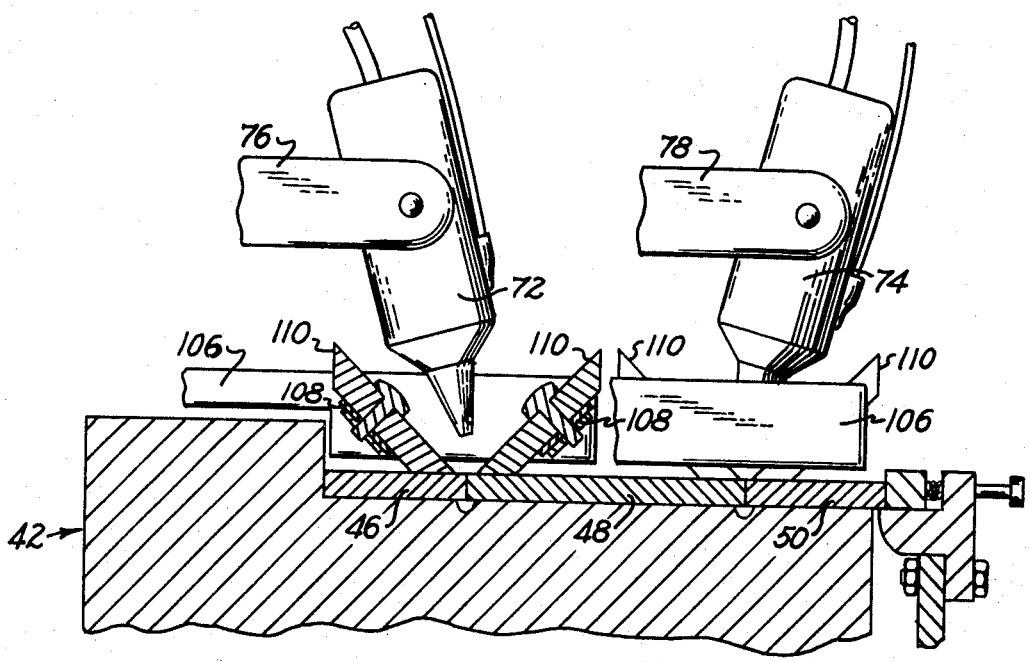
FIG. 9 is a partial section view to enlarged scale along line 9—9 of FIG. 8.

In another alternate embodiment of this invention, additional heat-sink or chill means are arranged to engage other surfaces of the metal strips 46, 48 and 50 as the strips are welded together, thereby to further limit the widths of the welds 90 and 92 formed between the strip materials. See FIGS. 8 and 9. For example, in a preferred arrangement, pairs of supports 106 attached to the apparatus frame 12 extend outwardly from the frame on either side of the respective weld means 72 and 74 and pairs of straps 108 (see FIG. 9) are extended between each pair of supports 106 to rotatably mount bevel-edged rolls 110 of copper or other heat-conducting material so that the bevel rolls rotate in engagement with the metal strips 46, 48 and 50 close to the abutting edges of the strips as the strips are moved through the weld zone and are welded together, thereby to rapidly conduct heat away from the strips as welding occurs for limiting the widths of the welds 90 and 92 formed between the strips. Of course, other chill roll arrangements can also be utilized within the scope of this invention as space in the weld area permits.

Figure 10:
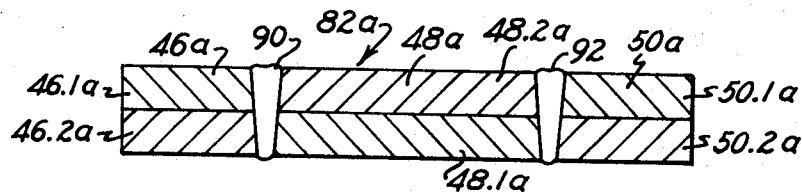
FIG. 10 is a section view similar to FIG. 4 illustrating an alternate stage product of the process of this invention.

It will be understood that the apparatus of this invention is also adapted for use in making other types of edge-lay materials. See FIG. 10. For example, each of the strips 46, 48 and 50 utilized as starting materials in the processes described with reference to FIGS. 1 and 6 are replaced with relatively long and thin strips of conventional two-layer thermostatic bimetal materials 46 a, 48 a and 50 a each having one layer of metal of relatively low coefficient of thermal expansion 46.1 a, 48.1 a and 50.1 a and one layer of metal of relatively high coefficient of thermal expansion 46.2 a, 48.2 a and 50.2 a. Two of these two layer strip materials are fed from the pay-off reels 14 and 18 respectively with the low expansion sides facing upwardly whereas one strip of the two-layer material is fed from the pay-off reel 16 with its high expansion side facing upwardly. These strip materials are then welded together in the manner previously described to from the composite material 82 a illustrated in FIG. 10. This composite material is then cooled and slit longitudinally through the metal strip 48 a to divide the composite material into two substantially identical strip materials, these divided strip materials each comprising what is commonly called a "reverse-welded" thermostatic bimetal material.

Figure 11:
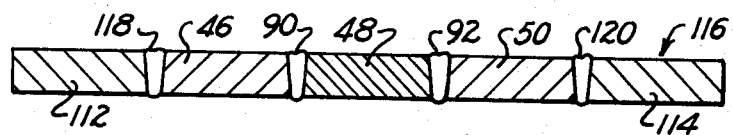
FIG. 11 is a section view similar to FIG. 4 illustrating another alternate stage product of the process of this invention.

Alternately, the apparatus of this invention is adapted to form other edgelay materials. See FIG. 11. That is, the apparatus of this invention as above-described with reference to FIG. 1 is modified to include five pay-off reels, to include four welding torches and to include a large heat-sink roll having four spaced circumferential grooves. Metal strip materials 46, 48 and 50 are fed from three of these pay-off reels in the manner described with reference to FIG. 1 and additional relatively long and thin strip materials 112 and 114 are fed from the remaining pay-off reels into edgewise abutting engagement with respective outer lateral edges of the strips 46 and 50, the strips 112 and 114 embodying any conventional low carbon steel for example. As these five strip materials are advanced through the apparatus of this invention, four welds 90, 92, 118 and 120 are formed between abutting pairs of edges of the strips for forming a five-component composite material 116 as shown in FIG. 11, these four welds being formed substantially simultaneously for the reasons previously advanced with reference to FIG. 1. After cooling, the composite material 116 is slit longitudinally through the central strip 48 embodied in the composite to form two substantially identical three-component edgelay materials as will be understood. In such three-component edgelay materials, the strip material 112 or 114 embodied therein serves as a support material for use in mounting thermostatic parts formed from the three-component materials, thereby reducing the amount of the more expensive strip materials 46, 48 or 50 which are required in making such parts.

It should be understood that although particular embodiments of the methods and apparatus of this invention have been described by way of illustrating the inventions, these inventions include all modifications and equivalents of the described embodiments which fall within the scope of the appended claims.

We claim:

1. The method of making an edgelay multimetal component embodying a pair of relatively long and thin metal elements of selected width which display relatively different thermal expansion properties and which have thin lateral edges of said pair of elements welded to each other comprising the steps of:

disposing a pair of relatively long and thin metal elements having selected widths and having the same selected thermal expansion properties with the relatively thin lateral edges thereof in edgewise abutting engagement with respective thin lateral edges of a relatively long and thin central metal element which has a selected width and which has other selected thermal expansion properties;

applying heat to said strips along said engaged thin lateral element edges to bring said edges to fusion temperature for welding said engaged thin edges together to form an edgelay multimetal material while subjecting said multimetal material to substantially the same degree of thermal expansion at either side of a line extending longitudinally along said central metal element; and dividing said central metal elements into two elements of lesser width for dividing said multimetal material longitudinally to form a pair of edgelay multimetal components each having a pair of relatively long and thin elements of selected width which display relatively different thermal expansion properties and which have thin lateral edges of said pair of elements welded to each other.

2. The method of making an edgelay thermostatic bimetal strip material comprising the steps of:

moving the thin lateral edges of two relatively long and thin metal strips of selected width having substantially the same coefficient of thermal expansion into edgewise abutting engagement with respective thin lateral edges of a third relatively long and thin metal strip of selected width which has another selected coefficient of thermal expansion;

applying heat to said two pairs of engaged strip edges progressively along the lengths of said edges to bring said edges to fusion temperature for progressively welding said engaged edges together to form an edgelay multimetal material, said heat being applied to said pairs of engaged strip edges substantially simultaneously at locations which are in closely spaced relation to each other to subject said multimetal material to substantially the same degree of thermal expansion at either side of a line extending longitudinally along said third strip of metal;

cooling said multimetal material; and dividing said third strip of metal into two elements of lesser width for dividing said multimetal material longitudi-nally to form a pair of edgelay thermostatic bimetal strip materials.

3. The method as set forth in claim 2 wherein said two metal strips are formed of the same material and have substantially the same width and thickness, wherein heat applied to said engaged strip edges for welding said engaged edges together subjects said multimetal material to substantially the same thermal expansion at either side of a line extending longitudinally along the center of said third metal strip, and wherein said multimetal material is divided longitudinally along the center of said third metal strip to form two substantially identical edgelay thermostatic bimetal strip materials.

4. The method as set forth in claim 3 wherein said third metal strip has substantially the same thickness as either of said two metal strips and has a width equal to about twice the width of either of said two metal strips.

5. The method as set forth in claim 2 wherein said engaged strip edges are welded together by applying heat to said metal strips progressively along said engaged strip edges to raise said strip materials to fusion temperatures at said strip edges for progressively welding said engaged strip edges together and wherein metal means of relatively higher thermal conductivity than said strip materials are engaged with said metal strips progressively along the lengths of said strips in closely spaced relation to said engaged strip edges as said heat is applied to said edges to rapidly withdraw heat from said metal strips to limit the portions of said strips which are heated to said fusion temperature for limiting the widths of said welds between said strips.

6. The method as set forth in claim 2 wherein said heat is substantially simultaneously applied to said two pairs of engaged strip edges from one side of said strips for welding portions of said engaged strip edges to each other and wherein additional heat is substantially simultaneously applied to said two pairs of engaged strip edges from the opposite side of said metal strips to weld remaining portions of said two pairs of engaged strip edges together while minimizing the widths of the welds between the strips.

7. The method as set forth in claim 2 wherein said metal strips are preheated to a temperature below the fusion temperature of said strip materials prior to applying said heat for welding said strips.

8. The method as set forth in claim 2 wherein said metal strips are welded together by tungsten inert gas shielded welding.

9. The method of making edgelay thermostatic bimetal strip materials comprising the steps of:
continuously advancing relatively long and thin strips of metal of selected thickness and width from respective coils thereof and continuously advancing a third relatively long and thin strip of metal of said selected thickness and of about twice said selected width from a coil thereof so that the thin lateral edges of said two metal strips are advanced into edgewise abutting engagement with respective thin lateral edges of said third metal strip, said two metal strips being formed of a material of relatively low coefficient of thermal expansion and said third metal strip being formed of a material of relatively high coefficient of thermal expansion;
continuously advancing said engaged metal strips through a welding zone and applying heat to said strips along said engaged strip edges to bring said strip edges to fusion temperature for thermally welding said two pairs of engaged strip edges together in said zone to form an edgelay multimetal material, said pairs of engaged strip edges being welded together substantially simultaneously at locations which are in closely spaced relation to each other within said zone to subject said multimetal material to substantially the same degree of thermal expansion, as a result of said welding, at either side of a line extending longitudinally along the center of said third strip of metal;
continuously coiling said multimetal material as it is advanced from said welding zone;
cooling said multimetal material; and
dividing said third strip of metal into two elements of lesser width for dividing multimetal material longitudinally to form two substantially identical, edgelay thermostatic bimetal strip materials.

10. The method of making an edgelay thermostatic bimetal strip material having a support material attached thereto, said method comprising the steps of:
moving the thin lateral edges of two relatively long and thin strips of metal of materials which display substantially the same coefficient of thermal expansion into edgewise abutting engagement with respective thin lateral edges of a relatively long and thin central strip of metal of a material which displays another selected coefficient of thermal expansion;
moving the thin lateral edges of two additional, relatively long and thin strips of metal of support materials which display a common coefficient of thermal expansion into edgewise abutting engagement with respective outer thin lateral edges of said first named two strips of metal;
applying heat to said strip materials progressively along said engaged strip edges to bring said strip edges to fusion temperature for thermally welding said four pairs of engaged strip edges together progressively along the lengths of said engaged strip edges to form an edgelay multimetal material, said pairs of engaged strip edges being welded together substantially simultaneously at locations which are in closely spaced relation to each other to subject said multimetal material to substantially the same degree of thermal expansion, as a result of said welding, at either side of a line extending longitudinally along said central strip of metal;
cooling said multimetal material; and
dividing said central strip of metal into two elements of lesser width for dividing said multimetal material longitudinally to form a pair of edgelay thermostatic bimetal strip materials each having a support material attached thereto.

11. The method of making a reverse-welded edgelay thermostatic bimetal strip material comprising the steps of:
moving the thin lateral edges of two relatively long and thin strips of a bimetallic material into edgewise abutting engagement with respective thin lateral edges of a relatively long and thin central strip of said bimetallic material, said strips of bimetallic material each having one layer of metal of relatively low coefficient of thermal expansion interfacially bonded to a second layer of metal of relatively high coefficient of thermal expansion, said first named two strips of said bimetallic material having said one layer of metal facing in one direction and said central strip of said bimetallic material having said one layer of metal facing in an opposite direction;

applying heat to said strip materials progressively along said engaged strip edges to bring said strip edges to fusion temperature for thermally welding said two pairs of engaged strip edges together progressively along the lengths of said edges to form an edgelay multimetal material, said pairs of engaged strip edges being welded together substantially simultaneously at locations which are in closely spaced relation to each other to subject said multimetal material to substantially the same degree of thermal expansion, as a result of said welding, at either side of a line extending longitudinally along said central strip of bimetallic material;

cooling said multimetal material; and dividing said central strip of bimetallic material into two elements of lesser width for dividing said multimetal material longitudinally to form a pair of reverse-welded edgelay thermostatic bimetal strip materials.

* * * * *